Patented Apr. 10, 1934

1,954,484

UNITED STATES PATENT OFFICE 1,954,484

PROCESS OF PRODUCING DERIVATIVES OF DIPHENYLMETHANE

Edwin Lorenzo Mattison, Carneys Point, N. J., assignor to E. I. du Pont de Nemours & Company, Wilmington, Del., a corporation of Delaware No Drawing. Application August 27, 1932, Serial No. 630,704

9 Claims. (Cl. 260—64)

This invention relates to the manufacture of condensation products of aldehydes and amines, and more particularly refers to the production of derivatives of diphenylmethane.

Derivatives of diphenylmethane were heretofore produced by the action of aldehydes on amines in the presence of strong mineral acids, such as hydrochloric and sulfuric acids. The yield produced by this reaction was considerably lower than the theoretical, and the quality of the product was so poor that it was frequently necessary to purify it by means of tedious and expensive methods before it could be used in any reaction requiring a high degree of purity. The presence of the required large amounts of strong mineral acids necessitated the use of special acid resistant equipment which also increased to a considerable extent the cost of production.

It is an object of this invention to produce condensation products of aldehydes and amines in a much higher yield than was heretofore possible. A further object is to produce these products in such a manner that they are practically uncontaminated with impurities. A still further object is to devise a process wherein the necessity of using expensive acid resistant apparatus is obviated. Additional objects will appear hereinafter.

These objects are accomplished by the process of the present invention, wherein an aldehyde, particularly formaldehyde, and an amine are reacted in the presence of an ammonium salt or an alkyl-ammonium compound.

The invention will be more completely understood by reference to the following illustrative examples in which the quantities are stated in parts by weight.

Example 1

300 parts water, 300 parts diethylaniline, 15 parts alcohol, 10 parts ammonium sulfate, 8 parts ammonia (28% solution) and 150 parts formaldehyde (37% solution) were placed in a steam heated kettle equipped with agitator, reflux condenser, and thermometer. The thoroughly agitated mixture was heated at 100° to 102° C. for 25 hours. The reaction mixture at the end of this period was cooled to 20° C. The p:p'-tetra-ethyl-diamino-diphenyl-methane separated from the mixture as a granular solid. It was collected by filtration and washed with cold water.

The freezing point of the p:p'-tetra-ethyl-diamino-diphenylmethane was 40.4° C. and the yield was almost theoretical.

Other dialkyl amines such as dimethyl-, dipropyl-, dibutyl-, or diamyl-anilines may be substituted for diethylaniline in the example given above. The same is true of mono-alkyl aniline compounds.

Example 2

240 parts dimethylaniline, 600 parts water, 10 parts ammonium sulfate, and 87.5 parts formaldehyde (37% solution) were placed, in the order named, in a steam heated kettle equipped with an agitator, reflux condenser, and thermometer. The thoroughly agitated mixture was heated at 100–102° C. until the reaction was completed. The period of heating was less than 25 hours. p:p'-tetra-methyl - diamino - diphenylmethane separated from the mixture on cooling as a granular solid, and was collected by filtration and washed with cold water. The freezing point of the p:p' - tetra - methyl - diamino - diphenylmethane was 86–87° C. and the yield was 95%.

Other mono- and di-alkyl anilines such as mono- or dipropyl-, mono- or dibutyl-, or mono- or diamyl-aniline may be substituted for dimethylaniline in the above example.

Example 3

300 parts water, 270 parts monoethyl-orthotoluidine, 10 parts ammonium sulfate, 8 parts ammonia (28% solution) and 150 parts formaldehyde (37% solution) were placed in a steam heated kettle equipped with agitator, reflux condenser, and thermometer. The thoroughly agitated mixture was heated at 100–102° C. until the reaction was completed, from 20–25 hours, and the mixture cooled. The p : p'-diethyl-diamino-m:m'-dimethyl-diphenylmethane separated as a granular solid and was collected by filtration and washed with cold water.

The freezing point of the p:p'-diethyl-diamino-m:m'-dimethyl-diphenylmethane was 89° C. and the yield was about 94%.

Other monoalkyl ortho-toluidines such as monomethyl-, monopropyl-, monobutyl-, or monoamyl-ortho-toluidine may be substituted for the monoethyl-ortho-toluidine in the above example. Likewise, mono- or di-alkyl-beta-naphthylamines, or mono-alkyl-alpha-naphthylamines, such as mono- or di-ethyl-beta-naphthylamine, or mono-methyl-alpha-naphthylamine may be used with excellent results.

In the above illustrative examples various alkyl-substituted amines are referred to in order to more adequately describe the present invention. However, it is not intended that these examples should be considered as a limitation, since the process might be carried out with equally satisfactory results by the use of other alkyl-substituted amines. In general, it may be said that any mono- or di-alkyl aniline, mono-alkyl-o-toluidine, mono-alkyl-alpha-naphthylamine, or mono- or di-alkyl-beta-naphthylamine may be reacted with formaldehyde according to the process of the present invention to produce a diphenyl- or dinaphthyl-methane derivatives. Naturally, the particular compound desired will be the determining factor in selecting the reactants. Knowing the compound to be synthesized, it is merely necessary to select the proper reactants, condensation of which will give the desired compound, and then carry out the reaction in the presence of an ammonium salt or an alkyl-ammonium compound, as described in the present invention.

The ammonium salt in the presence of which the reaction is carried out may be that of either an inorganic or an organic acid. Among such salts are the following: ammonium sulfate, ammonium nitrate, ammonium sulfite, ammonium chloride, ammonium oxalate, ammonium-benzene-sulfonate, and ammonium formate. There are numerous other ammonium salts of inorganic and organic acids which might also be used with good results but since they they are well known to one skilled in the art the previously mentioned brief list of representative salts is considered sufficient. In addition to the ammonium salts of organic and inorganic acids, alkyl-ammonium compounds may also be used. The various dialkyl amines and their hydrochlorides, such as dimethyl-amine and dimethyl-amine hydrochloride, are examples of these compounds.

The proportions of reacting substances may be varied within rather wide limits without affecting the high yield and purity of the product. This is also true of the conditions, such as temperature and time, under which the reaction is carried out. It is unnecessary to use a mineral acid in carrying out the process of the present invention. Likewise the use of a solvent or of ammonia is not required. However, in certain cases the advantages derived from the use of an ammonium salt or an alkyl-ammonium compound may be further enhanced by the addition of a small amount of a solvent, and/or a mineral acid and/or ammonia. The addition of one or more of these compounds is not essential in order to obtain the benefits of the present invention. However in some cases, well known to one skilled in the art, their presence will increase to a certain extent the benefits which would be derived from the use of the ammonium salt or alkyl-ammonium compound alone. Consequently, it is intended that this invention shall cover the case where one or more of these compounds are used in carry out the reaction. For this reason where a solution of an aldehyde and an amine is referred to in any part of the present specification and claims it is to be understood that such solution may contain a solvent and/or a mineral acid and/or ammonia.

The process described herein produces a yield of aldehyde-amine condensation products which is practically equivalent to the theoretical. The purity of such products is extremely high and they may be used in very delicate reactions without further purification. The slight amount of impurities which may be present in a few exceptional cases is easily removed by washing or by any other well known method. The reaction may be carried out in ordinary equipment, eliminating the necessity of special and expensive acid resistant equipment. The products have a wide range of utility in the commercial arts, particularly in the preparation of dyes and pharmaceuticals.

As many apparently widely different embodiments of this invention may be made without departing from the spirit and scope thereof, it is to be understood that I do not limit myself to the foregoing examples or descriptions except as indicated in the following claims.

I claim:

1. A process for producing derivatives of methane which comprises heating a solution of formaldehyde and a member selected from the group consisting of mono- and di-alkyl anilines, mono-alkyl-o-toluidine, mono-alkyl-a-naphthylamine, and mono- and di-alkyl-beta-naphthylamines, in the presence of a member selected from the group consisting of ammonium salts and alkyl-ammonium compounds.

2. A process for producing derivatives of diphenyl-methane which comprises heating a solution of formaldehyde and a di-alkyl aniline in the presence of a member selected from the group consisting of ammonium salts and alkyl-ammonium compounds.

3. A process for producing derivatives of diphenyl-methane which comprises heating a solution of formaldehyde and a dialkyl-aniline in the presence of an ammonium salt.

4. A process for producing derivatives of diphenyl-methane which comprises heating a solution of formaldehyde and a di-alkyl aniline in the presence of ammonium sulfate.

5. A process for producing p-p'-tetra-ethyl-diamino-diphenyl-methane which comprises heating a solution of formaldehyde and diethyl-aniline in the presence of a member selected from the group consisting of ammonium salts and alkyl-ammonium compounds.

6. A process for producing p-p'-tetra-ethyl-diamino-diphenyl-methane which comprises heating a solution of formaldehyde and diethyl-aniline in the presence of ammonium sulfate.

7. A process for producing derivatives of diphenyl-methane which comprises heating a solution of formaldehyde and a mono-alkyl-o-toluidine in the presence of a member selected from the group consisting of ammonium salts and alkyl-ammonium compounds.

8. A process for producing derivatives of diphenyl-methane which comprises heating a solution of formaldehyde and a mono-alkyl-aniline in the presence of an ammonium salt.

9. A process for producing derivatives of diphenyl-methane which comprises heating a solution of formaldehyde and mono-alkyl-ortho-toluidine in the presence of an ammonium salt.

EDWIN LORENZO MATTISON.